United States Patent
Schmidt et al.

(10) Patent No.: US 9,920,237 B2
(45) Date of Patent: Mar. 20, 2018

(54) ROBUST BINDER, WHICH IS INDEPENDENT FROM THE INFLUENCE OF CATALYTICALLY ACTIVE SUBSTANCES, FOR USE IN THE CRUDE OIL AND NATURAL GAS INDUSTRY

(71) Applicant: EPG (Engineered nanoProducts Germany) AG, Griesheim (DE)

(72) Inventors: Helmut Schmidt, Saarbruecken-Guedingen (DE); Christian Schmidt, Saarbruecken (DE)

(73) Assignee: EPG (ENGINEERED NANOPRODUCTS GERMANY) AG, Griesheim (DE)

( * ) Notice: Subject to any disclaimer, the term of this patent is extended or adjusted under 35 U.S.C. 154(b) by 130 days.

(21) Appl. No.: 14/429,521

(22) PCT Filed: Sep. 26, 2013

(86) PCT No.: PCT/EP2013/070121
§ 371 (c)(1),
(2) Date: Mar. 19, 2015

(87) PCT Pub. No.: WO2014/049083
PCT Pub. Date: Apr. 3, 2014

(65) Prior Publication Data
US 2015/0232737 A1    Aug. 20, 2015

(30) Foreign Application Priority Data

Sep. 27, 2012  (DE) ........................ 10 2012 019 149

(51) Int. Cl.
C09K 8/56      (2006.01)
E21B 43/26     (2006.01)
E21B 43/16     (2006.01)

(52) U.S. Cl.
CPC ................ *C09K 8/56* (2013.01); *E21B 43/16* (2013.01)

(58) Field of Classification Search
None
See application file for complete search history.

(56) References Cited

U.S. PATENT DOCUMENTS

| | | |
|---|---|---|
| 5,254,638 A | 10/1993 | Novak et al. |
| 5,421,043 A | 5/1995 | Novak et al. |
| 7,813,246 B2 | 10/2010 | Iguchi et al. |
| 7,825,074 B2 | 11/2010 | Schmidt et al. |
| 8,003,579 B2 | 8/2011 | Akarsu et al. |
| 8,003,580 B2 | 8/2011 | Altherr et al. |
| 8,163,677 B2 | 4/2012 | Endres et al. |
| 8,901,047 B2 | 12/2014 | Schmidt et al. |
| 2007/0158070 A1 | 7/2007 | Endres et al. |
| 2009/0025021 A1 | 1/2009 | Iguchi et al. |
| 2009/0233818 A1 | 9/2009 | Schmidt et al. |
| 2009/0250218 A1* | 10/2009 | Akarsu ................. C04B 12/04 166/292 |
| 2009/0264323 A1 | 10/2009 | Altherr et al. |
| 2011/0039737 A1* | 2/2011 | Schmidt ................. C04B 26/30 507/224 |

FOREIGN PATENT DOCUMENTS

| | | |
|---|---|---|
| DE | 102004004615 A1 | 8/2005 |
| EP | 1841833 B2 | 10/2007 |
| GB | 1295902 A | 11/1972 |
| GB | 1347068 A | 2/1974 |
| WO | 2007121972 A1 | 11/2007 |
| WO | 2007121975 A1 | 11/2007 |
| WO | 2009106562 A1 | 9/2009 |

* cited by examiner

Primary Examiner — John J Figueroa
(74) Attorney, Agent, or Firm — Abel Law Group, LLP

(57) ABSTRACT

The invention relates to a method of stabilizing the bonding agent gelation time in the consolidation of a geological formation in the presence of one or more catalytically active substances, in which method a bonding agent is infiltrated into the formation, a portion of the infiltrated bonding agent is optionally expelled by flushing with a gas or a liquid, and the bonding agent remaining in the formation is cured. the bonding agent comprises a mixture of a) a heterocondensate, obtainable by hydrolysis and condensation of at least one hydrolyzable silicon compound and at least one metal, phosphorus or boron compound, the metal being selected from Al, Ge, Sn, Pb, Ti, Mg, Li, V, Nb, Ta, Zr and Hf, B) at least one organic polymerizable monomer or oligomer comprising a C-C double bond, and C) at least one thermal polymerization initiator without peroxide function.

20 Claims, No Drawings

ROBUST BINDER, WHICH IS INDEPENDENT FROM THE INFLUENCE OF CATALYTICALLY ACTIVE SUBSTANCES, FOR USE IN THE CRUDE OIL AND NATURAL GAS INDUSTRY

BACKGROUND OF THE INVENTION

1. Field of the Invention

The invention relates to a method of stabilising the bonding agent gelation time in the consolidation of a geological formation in the presence of catalytically active substances, the use of a bonding agent therefor and the bonding agent used therefor.

2. Discussion of Background Information

Bonding agents for bonding embankments and loose formations are known. Thus e.g. DE-A-102004004615, EP-A-06706316, WO 2007/121972, WO 2007/121975 and WO 2009/106562 describe systems which are used for the consolidation of embankments or loose formations. The procedure is generally such that a reactive soluble system infiltrates into an embankment or loose formation and is solidified by way of a reaction. If the curing is effected by means of a radical polymerization process, peroxides are commonly used as thermal polymerization initiators.

Peroxides of widely varying type are known as important radical starters in the polymerization of organic double bonds, particularly in olefins. The mechanism is based on the dissolution of the oxygen-oxygen bond into two fragments containing radicals, which transmit their radical electron to the double bond and thus stimulate a chain reaction, which finally results in the formation of polymers. The dissolution of the oxygen-oxygen bond can be effected by the supply of energy, for instance thermal or light energy.

The stability of the oxygen-oxygen bond depends very strongly on the structure of the molecule which carries this bond. Depending on the compensation ability of the polarity of the oxygen-oxygen bond by the remaining bonds in the molecule, the formation of radicals is possible by the dissolution of the oxygen-oxygen bond in relatively diverse temperature ranges. This has been made use of to control the polymerization temperature of olefins in chemical engineering. Working temperatures of 20-120° C. for initiating the polymerization are possible.

Due to the metastability of the oxygen-oxygen bond, catalytically active compounds can significantly alter the thermally determined decomposition temperature and thus the formation of radicals. Thus it is, for example, known that metal ions, such as copper ions or iron ions, have a significant influence on the decomposition temperature. Furthermore, crystalline compounds, such as oxides, e.g. aluminium oxides, silicate deposits or iron oxides, can influence the decomposition temperature. Understandably, the smaller the oxide structures the greater is this effect. This is known from catalyst chemistry, for which reason there is a tendency to use catalytically active solid bodies in as small a division as possible (enlargement of the active surface; nanocatalysis).

However, components which act catalytically on the decomposition temperature are disruptive in many applications, particularly if it is not known what components are present in what concentration in certain usages. Control of the polymerization process is then difficult if not impossible. Furthermore, other thermodynamic parameters, such as the pH value, or the solvent, can have a strong influence on the decomposition rate and radical formation.

A precise adjustment of the parameters is, however, extremely difficult, if not impossible, in the intended application, namely when treating a geological formation in the extraction of oil and gas.

Thus the bonding agent can be contaminated with metal ions and iron oxides even when being pumped into the formation by contact with conduits and production equipment. The pipes are generally of soft steel and thus not very corrosion-resistant because they must be coiled up and used in so-called coils of up to many 1000 m of length. These coils are generally coated internally by a rough layer of rust and it has transpired that both these layers of rust and also the bare metal have a very strong catalytic effect on the decomposition of peroxides, whereby the gelation time can shorten considerably when using peroxides as initiators.

A further critical point is the extremely variable composition of the geological formations, e.g. as regards the minerals which are present, sand types, porosity etc. This means that such binders based on peroxide initiators can be critical or too unstable, depending on the geographical location.

One application, in which these effects are particularly disruptive is, as already briefly noted, the application of bonding agents with monomers, which are to be solidified, in the oil and gas producing industry. For example, in order to stabilize geological formations, monomers with polymerizable double bonds in dissolved or liquid form are pumped into them. The higher temperatures, which generally prevail in the formations, are used for the radical polymerization. It is of importance that this occurs only in situ as a result of the temperature-determined decomposition of the initiators and not previously as a result of catalysis since there is otherwise the risk of the blockage of feed lines, pumps and valves and also of the pores in the formation. The setting characteristics of the bonding agents must thus be so set that solidification reliably begins only when the infiltration and the recreation of the permeability of the formation has come to an end.

In tests to determine the polymerization time with so-called inorganic-organic bonding agents, e.g. Nanoglue®, with which the solidification proceeds as a result of silanes with methacrylate groups and as a result of diacrylates by polymerization in the formation, it has been ascertained that components of the formation, metals or iron oxide-containing components, e.g. in the form of sands, influence the formation of radicals with peroxides in an uncontrollable manner and forecasts are scarcely possible with regard to the desired temperature-determined polymerization after injection of the bonding agent into the formation.

Thus, for example, on contact with the coiled tubing or the addition of sands of differing grain size, grain shape and minerality when using peroxides, differences in the gel formation time of over 50% have been observed. It is problematic in this connection that an uncontrolled acceleration could be observed in each case, whereby the risk of premature setting of the bonding agent is considerably increased.

Using such systems, which essentially have an excellent solidification mechanism, in the oil and gas industry is thus risky if not wholly impossible.

The object was the provision of a robust bonding agent and a method of consolidating geological formations with this bonding agent, in which the gelation time of the bonding agent is not altered uncontrollably, in particular is not shortened, by the nature and concentration of additional additives in the bonding agent, changes in pH and, in particular, the conditions in the geological formation, such as nature and concentration of the minerals and the catalytically active substances etc.

It has now surprisingly been found that other radical formers, which include no peroxide functionality, such as azo compounds or compounds with a C—C single bond, which can be homolytically dissociated by thermal energy, do not exhibit a shortening in the gelation time or only to a very small degree. It has transpired that when using such radical starters in the polymerization of the inorganic-organic bonding agent in the formation, the iron content plays no role or only a very small role, i.e. the gelation time is scarcely influenced or slightly extended, whereby the pumping in and the flushing of the bonding agent can be ensured. The use of radical starters without peroxide functionality results in an adequate constancy of the gelation times on contact with different substances. This system does not react with a shortening of the gelation times on the addition of metal ions, special sands or on contact with coiled tubing, as was observed with peroxides.

This was not to be anticipated. Without wishing to be bound by a theory, this phenomenon can perhaps be explained by the fact that the ionic or catalytically active systems referred to above, as are common in the crude oil industry in the production equipment and formations, act on peroxides via unknown mechanisms whilst azo compounds, on the other hand, are more or less uninfluenced. On the basis of this surprising fact, a binder system, such as the described Nanoglue® system, can be used with azo compounds or other non-peroxide initiators for the intended application for stabilizing oil and gas sources.

SUMMARY OF THE INVENTION

The invention thus relates to a method of stabilizing the bonding agent gelation time in the consolidation of geological formations in the presence of one or more catalytically active substances, in which a bonding agent is infiltrated into the formation, a proportion of the infiltrated bonding agent is optionally expelled by flushing with a gas or a liquid, and the bonding agent remaining in the formation is cured, wherein the bonding agent includes a mixture of A) a heterocondensate, obtainable by hydrolysis and condensation of at least one hydrolyzable silicon compound and at least one metal, phosphorus or boron compound, wherein the metal is selected from Al, Ge, Sn, Pb, Ti, Mg, Li, V, Nb, Ta, Zr and Hf, B) at least one organic polymerizable monomer or oligomer which has at least one C—C double bond, and C) at least one thermally activatable polymerization initiator (radical former) which is not peroxide based.

The gelation time is the time which is required in order for the liquid or viscous bonding agent to gel. This time is important because transport of the bonding agent after gelling is no longer possible. Premature gelling can therefore result in blockage of the conduits or excess bonding agent not being able to be expelled so that the desired porosity cannot be achieved. The gelling is caused by polymerization in the bonding agent, which is in turn started by thermal polymerization initiators. In addition to the type and concentration of the bonding agent and the polymerization initiator and the temperature, the gelation time depends also on other factors, such as additional additives in the bonding agent, pH value and nature of the geological formation, particularly the catalytically active species contained therein. As explained above, these other factors can differ significantly in a natural system such as a geological formation.

As a result of the use of thermal initiators, which include no peroxide function, the gelation time of the bonding agent can be stabilized, i.e. the gelation time is independent of changes in the concentration of additional additives in the bonding agent, changes in the pH or the characteristics of the geological formations and the production equipment, particularly the catalytically active substances contained therein. The stabilisation does not result in complete independence of these factors but the influence is significantly smaller than with other bonding agents, in which peroxides are contained.

In addition to the preferably radical polymerization, the term polymerization used herein includes in general, if not specified in more detail, polycondensation and polyaddition. The invention will be described below.

The geological formation to be consolidated can be any formation of the earth's crust. The formation can include differing substrates, e.g. rock layers of varying minerality, soil, sand, clays, ores, coal or mixtures thereof. The geological formation can also be located beneath the sea or beneath a lake. It can also include formations such as landfill. The consolidation can e.g. be necessary because the formation includes movable or loose regions or consists of them, e.g. sand or another unbound material, such as rock. The consolidation can be appropriate in order to create bores or to conduct gaseous or liquid media through the formations.

The formation or a formation situated beneath it preferably includes crude oil or natural gas. Such formations or deposits are known to the expert. These are preferably oil-, gas- or water-conducting geological formations. They are frequently sand-containing formations.

The catalytically active substances, which can be present in such geological formations, can be crystalline compounds, iron oxides, sand grains, clay, transition metal ions, acids and/or bases. Examples of crystalline compounds are oxides, such as aluminium oxides, silicate deposits, iron oxides, quartz or feldspar. Examples of transition metal ions are iron and copper irons. Metal ions in hydrated form or in the form of hydroxides can act as acids or bases. Depending on the geographical situation of sands, they can be of differing grain size, grain shape and minerality with varying catalytic activity.

In one embodiment, a steel pipe is inserted into the geological formation. The bonding agent can be conducted into the formation through the steel pipe. As stated, pipes of soft steel, which are wound up into coils, are used in order to introduce necessary chemicals into the formation. The coils are generally covered internally by a layer of rust. The high catalytic activity of such iron oxides is known. Nevertheless, stable gelation times can be achieved with the bonding agent of the invention even in the presence of such coils.

The bonding agent in accordance with the invention is infiltrated into the geological formation in order to stabilise the formation. Procedures suitable for this are known to be expert. The infiltration can be effected e.g. by pumping the bonding agent into the formation. The expert can readily determine the suitable pressure and the amount necessary for the particular purpose. The pressure depends e.g. on the set viscosity of the bonding agent and naturally, in particular, on the characteristics of the formation. High pressure pumps or injection pumps suitable for this purpose are commercially available. The bonding agent can also be infiltrated into the formation e.g. by way of bores which are already present. The bonding agent can be infiltrated into the geological formation at one or more positions.

The infiltration of the bonding agent in accordance with the invention into the formation results in a filling of voids or passages situated therein, whereby a seal of greater or lesser strength is produced. If the infiltrated bonding agent is caused thereafter directly to set, the desired strength is achieved but this can result in a partial or complete loss of permeability of the formation. This would make the production of crude oil or natural gas difficult or even impossible.

It is therefore preferred that the geological formation be flushed with a gas or a liquid after the infiltration of the bonding agent and before it is cured in order to expel a proportion of the infiltrated bonding agent out of the formation. A large proportion of the original permeability or porosity of the formation is thus generally maintained in this manner. The purging (flushing) of geological formations with gaseous or liquid media is known.

The gas used to flush the bonding agent in accordance with the invention can be e.g. nitrogen, $CO_2$ or air. A liquid is preferably used for the purpose of flushing. The liquid used to flush the infiltrated bonding agent is water- or oil-based solutions. The liquid can contain additives, e.g. tensides, emulsifiers, catalysts, gas-liberating components and/or dissolved substances, such as salts.

The flushing gas and the flushing liquid can be forced into the geological formation in the same manner as the bonding agent, e.g. by high pressure pumps or injection pumps, in order to achieve the flushing. The same pumps can be used as were used for the infiltration of the bonding agent, whereby the pumps should optionally be cleaned beforehand. The flushing medium can also be introduced via a bore which is already present. The flushing medium can be forced into the formation at one or more positions. These positions can be the same as those at which the bonding agent was infiltrated or not.

The flushing is effected, particularly before the curing of the bonding agent, over a specific period of time. If the flushing is effected with the liquid, it is preferred that the bonding agent includes a hydrolyzable silicon compound, which includes a non-hydrolyzable organic residue with at least one hydrophilic group. An increased strength can thus be achieved. The optional use and the mode of operation of the hydrophilic silane will be discussed below.

Parameters for the flushing, such as duration, time, amount or flow speed of the gaseous or liquid phase can be readily selected in a suitable manner by the expert in order to set the desired porosity. By pumping the gaseous or liquid medium through, pore volumes in the formation are flushed clear. Reaction products can also be discharged from the bonding agent.

As a result of the flushing process, the proportion of the infiltrated bonding agent in accordance with the invention, which is situated in the pores or passages, is expelled again. The amount of the expelled bonding agent can be controlled by the parameters referred to above and optionally by adjustment of the bonding agent, e.g. as regards viscosity or composition.

The amount of the bonding agent to be expelled can vary depending on the formation that is present, the bonding agent that is used and the desired permeability. In general, at least 1, preferably at least 5 and particularly preferably at least 15 wt. % of solid material from the infiltrated bonding agent should remain in the formation after the flushing. Correspondingly, it is preferred if at least 40, preferably at least 60 and particularly preferably at least 70 wt. % of the infiltrated bonding agent is expelled from the formation by the flushing. Suitable amounts of bonding agent remaining in the formation are e.g. 5 to 45 wt. % or 10 to 40 wt. % of the infiltrated bonding agent.

The curing of the bonding agent occurs after the infiltration and, if performed, after the flushing with gas or liquid. For the curing, one or more thermal polymerization initiators without peroxide functionality or radical starters are contained in the bonding agent in order to start the polymerization of the polymerizable groups, preferably organic double bonds, contained in the bonding agent. The start temperature of the initiators is set so that they become active at the temperature of the formation. The bonding agent in accordance with the invention additionally cures as a result of the condensation of the cross-linkable SiOH groups or metal OH groups, which are synthesized in the production of the bonding agent and bring about a further cross-linking whilst forming an inorganic network.

The new bonding agent in accordance with the invention is also suitable in particular for use with geological formations which conduct water. Hydrothermal conditions can be present at relatively large depths, i.e. an increased temperature and increased pressure. With ordinary bonding agents, the long-term resistance, in particular, is very critical under such conditions. A particular advantage of the bonding agent in accordance with the invention resides in the fact that it can also be used under such hydrothermal conditions.

The setting (curing) preferably occurs for such applications under increased temperature and increased pressure or normal pressure, with respect to the normal conditions, i.e. the pressure is the same or higher than 1 bar and the temperature is higher than 20° C. The bonding agent can, in accordance with the geological boundary conditions of the formation, in which it is used, in general be cured at temperatures of above 25° C. or above 30° C. and/or pressures of 1 bar or more, e.g. more than 1.2 bar or 2 bar or even more than 40 bar.

The curing can be effected in dependence on the chemical properties of the organic and inorganic components of the bonding agent by way of inorganic condensation reactions and by way of polymerization reactions of the organic, polymerizable monomers or oligomers which are used, wherein before, after or in parallel with the polymerization of the organic monomers or oligomers a further condensation of the inorganic components of the bonding agent takes place, which also contributes to the curing.

Geological formations can be consolidated with a stabilized gelation time with the method in accordance with the invention, particularly geological formations for oil and gas production. It enables the maintenance of porosity and permeability, whereby the exploitation of oil and gas sources can be substantially facilitated.

The bonding agent in accordance with the invention and its production will be described below. The bonding agent described below can be used in methods in accordance with the invention and for the use in accordance with the invention. The bonding agent is, in particular, an oil-, hot water- and temperature-resistant bonding agent.

The bonding agent comprises a heterocondensate, which is obtained by hydrolysis and condensation of at least one hydrolyzable silicon compound and at least one metal, phosphorus or boron compound. One, two or more hydrolyzable silicon compounds and/or one, two or more metal, phosphorus or boron compounds can be used. The at least one hydrolyzable silicon compound preferably includes one or more hydrolyzable silicon compounds with at least one non-hydrolyzable organic residue, wherein the organic residue is preferably an alkyl or aryl residue or an organic residue with polymerizable groups.

The at least one hydrolyzable silicon compound can be e.g. at least one hydrolyzable silicon compound without non-hydrolyzable groups. Examples of hydrolyzable silicon compounds without non-hydrolyzable groups which may be used are silicon compounds of the general formula $$SiX_4 \qquad (I)$$

wherein the residues X are the same or different and represent hydrolytically separable groups or hydroxyl groups Suitable examples of hydrolytically separable or hydrolyzable groups X are hydrogen, halogen (F, Cl, Br or I, particularly Cl or Br), alkoxy (e.g. $C_{1-6}$-alkoxy, such as methoxy, ethoxy, n-propoxy, i-propoxy and n-, i-, sec.- or tertiary-butoxy), isocyanato, aryloxy (preferably $C_{6-10}$-aryloxy, such as phenoxy), alkaryloxy, e.g. benzoyloxy, acyloxy (e.g. $C_{1-6}$-acyloxy, preferably $C_{1-4}$-acyloxy, such as acetoxy or propionyloxy) and alkylcarbonyl (e.g. $C_{2-7}$-alkylcarbonyl, such as acetyl). Also suitable are $NH_2$ with alkyl, aryl and/or aralkyl mono- or disubstituted amino, wherein examples for the alkyl-, aryl and/or aralkyl residues are those given below for R, amido, such as benzamido or aldoxim or ketoxim groups. Two or three groups X can also be connected together, e.g. in the case of Si polyol complexes with glycol, glycerine or brenzcatechin. The aforementioned groups can optionally include substituents, such as halogen, hydroxyl or alkoxy.

Preferred hydrolyzable residues X are halogens, alkoxy groups and acyloxy groups. Particularly preferred hydrolyzable residues are alkoxy groups, preferably $C_{1-4}$-alkoxy groups, particularly methoxy and ethoxy.

Concrete examples of hydrolyzable silicon compounds of the formula $SiX_4$ are $Si(OCH_3)_4$, $Si(OC_2H_5)_4$, $Si(OC_3H_7)_4$, $SiCl_4$, $HSiCl_3$, $Si(OOCCH_3)_4$. Of these hydrolyzable silanes, tetraethoxysilane (TEOS) is particularly preferred.

As a further component for the heterocondensate an additional compound is used, particularly a hydrolyzable compound, of an element selected from the main groups I, II, III, IV and V and the subgroups IV and V. This is P, B or a metal from these groups, particularly Al, Ge, Sn, Pb, Ti, Mg, Li, V, Nb, Ta, Zr and Hf. As a result of these components, the corrosion resistance and hydrolysis resistance of the cured bonding agent is increased. Hydrolyzable compounds of titanium, aluminium, zirconium, tin and boron are particularly preferred, whereby titanium compounds are most preferred. The compounds can be used individually or as a mixture of two or more of these elements.

The metal, phosphorus or boron compound can be a compound of formula (II)

$$MX_a \qquad (II)$$

wherein M is P, B, Al, Ge, Sn, Pb, Ti, Mg, Li, V, Nb, Ta, Zr and Hf, X is the same or different and represents hydrolytically separable groups or hydroxyl groups and a corresponds to the valency of the element wherein, when using complex ligands, a can be greater or, with polydentate ligands, smaller than the valency of M, or corresponding soluble oxides or hydroxides. The valency of M is generally 1, 2, 3, 4 or 5. The compound of formula (II) optionally also includes a counterion. Examples of X are as defined above for formula (I), including the preferred examples, wherein two groups X can be replaced by an oxo group. In addition to the substituents given in formula (I), X can also be sulphate, nitrate, a complexing agent, such as e.g. a β-diketone, a saturated or unsaturated carbonic acid or a salt thereof, an inorganic acid or a salt thereof and an amino alcohol. The metal, phosphorus or boron compound is, in particular, a hydrolyzable compound. The phosphorus compound can be e.g. phosphorus oxides or phosphates. Metal or boron alkoxides are preferably used.

In a preferred embodiment, metal, phosphorus or boron compounds, which include complex ligands, or a combination of metal, phosphorus or boron compounds and a complex ligand are used. Without wishing to be bound by a theory, it is presumed that when using a combination of metal, phosphorus or boron compounds and a complex ligand for producing the hydrolysate and condensate a bonding of the complex ligand to the central atom of the metal, phosphorus or boron compound used can result in situ. The expert can readily select suitable combinations. The combination can be obtained e.g. by simple mixing of the two components. Examples of complex ligands are acetylacetenate, ethylacetoacetate, dialkyldithiophosphate, dodecylbenzenesulphonic acid, oleic acid and palmitic acid.

In one embodiment, the complex ligand can include a polymerizable residue. The polymerizable group can be any conventional group known to the expert, which can undergo polymerization with itself or one or more other corresponding, polymerizable groups.

The alkoxides of Ti, Zr and Al, particularly Ti, are preferred as the metal compounds. Suitable metal, phosphorus or boron compounds, including those with complexing agents, are e.g. $Ti(OC_2H_5)_4$ (TET), $Ti(O\text{-}n\text{-}$ or $i\text{-}C_3H_7)_4$, $Ti(OC_4H_9)_4$, $TiCl_4$, $Ti(O\text{-}iC_3H_7)_2Cl_2$, hexafluorotitanium acid, $TiOSO_4$, diisopropoxybis(ethylaceto-acetato)titanate, poly(dibutyltitanate), tetrakis(di-ethylamino)titanium, titanium-2-ethylhexoxide, titanium bis(triethanolamine)diisopropoxide, titanium chloride triisopropoxide, $Al(OC_2H_5)_3$, $Al(O\text{-sec.-}C_4H_9)_3$, $AlCl(OH)_2$, $Al(NO_3)_3$, $Zr(OC_3H_7)_4$, zirconium-2-ethylhexoxide, $BCl_3$, $B(OCH_3)_3$ and $SnCl_4$, $Zr(OC_3H_7)_2(OOC(CH_3)\!=\!CH_2)_2$, titanium acetylacetonate, titanium oxide bis(pentanedionate), $Ti(OC_3H_7)_3(OOC(CH_3)\!=\!CH_2)$ and $Ti(OC_2H_4)_3$(allyl acetoacetate), phosphorus oxides and phosphates. Of the metal compounds, $Ti(O\text{-}iC_3H_7)_4$, $Ti(OC_4H_9)_4$, titanium bis(triethanolamine)diisopropoxide and $Ti(OC_3H_7)_3(OOC(CH_3)\!=\!CH_2)$ and further complexing agents including Ti compounds are particularly preferred. As stated, a combination of the metal, phosphorus or boron compounds with the desired complexing agent can alternatively be used.

Optionally and preferably, in addition to or instead of the hydrolyzable silicon compounds of the formula (I) referred to above, one or more hydrolyzable silicon compounds with at least one non-hydrolyzable organic group can be used to form the heterocondensate. These can be e.g. compounds or silanes of the general formula (III)

$$R_nSiX_{4-n} \qquad (III)$$

wherein the resides R are the same or different and represent hydrolytically non-separable groups, the residues X are the same or different and represent hydrolytically separable groups or hydroxy groups and n has the value 1, 2 or 3, preferably 1.

As examples for X, reference is made to the examples for X in the formula (I) referred to above, wherein the preferred groups are preferred in this case also. The hydrolytically non-separable residues R are e.g. alkyl, e.g. $C_{1-20}$-alkyl, particularly $C_{1-4}$-alkyl, such as methyl, ethyl, n-propyl, i-propyl, n-butyl, i-butyl, sec.-butyl and tert.-butyl, aryl, particularly $C_{6-10}$-aryl, such as phenyl and naphthyl, and corresponding aralkyl and alkaryl groups, such as tolyl and benzyl, and cyclic $C_3$-$C_{12}$-alkyl groups, such as cyclopropyl, cyclopentyl and cyclohexyl. The residues R can have conventional substituents, e.g. halogens, such as chlorine or fluorine, and alkoxy, which is, however, not preferred. The residue R preferably has no polymerizable group. Preferred residues R are alkyl groups with preferably 1 to 4 carbon atoms, particularly methyl and ethyl, and aryl residues, such as phenyl.

Examples of concrete organosilanes of the general formula (III) are compounds of the following formulae:
$CH_3SiCl_3$, $CH_3Si(OC_2H_5)_3$, $C_2H_5SiCl_3$, $C_2H_5Si(OC_2H_5)_3$, $C_3H_7Si(OC_2H_5)_3$, $C_6H_5Si(OC_2H_5)_3$, $(C_2H_5O)_3Si-C_3H_6-Cl$, $(CH_3)_2SiCl_2$, $(CH_3)_2Si(OC_2H_5)_2$, $(CH_3)_2Si(OCH_3)_2$, $(CH_3)_2Si(OH)_2$, $(C_6H_5)_2SiCl_2$, $(C_6H_5)_2Si(OC_2H_5)_2$, $(i-C_3H_7)_3SiOH$, $n-C_6H_{13}CH_2CH_2Si(OC_2H_5)_3$, $n-C_8H_{17}CH_2CH_2Si(OC_2H_5)_3$, $CH_2OCH_2CH_2O(CH_2)_3-Si(OC_2H_5)_3$.

Particularly preferred silanes of the formula (III) are alkylsilanes, particularly alkyltrialkoxysilanes, wherein methyltrimethoxysilane and particularly methyltriethoxysilane (MTEOS) are particularly preferred.

In a further embodiment, a compound can be used as a hydrolyzable silicon compound with at least one non-hydrolyzable organic residue for producing the hydrolysate or heterocondensate whose non-hydrolyzable organic residue carries a polymerizable group. This can be silanes of the formula (III), in which at least one residue R, and preferably the single residue R (n=1), includes a polymerizable group and a divalent bridge group for bonding to the Si. The substitutent X and, if present, other residues R and n are also as defined in formula (III).

Examples of the polymerizable group are epoxide, hydroxy, amino, monoalkylamino, dialkylamino, optionally substituted anilino, amide, carboxy, alkenyl, alkinyl, acryloyl, acryloyloxy, methacryloyl, methacryloyloxy, mercapto, cyano, isocyanato, aldehyde, keto, alkylcarbonyl, acid anhydride and phosphoric acid. The polymerizable group is bonded to the silicon atom by way of divalent bridge groups, particularly alkylene or arylene bridge groups, which can be interrupted by oxygen- or NH-groups. The bridge groups include e.g. 1 to 6 carbon atoms. The aforementioned divalent bridge groups are derived from e.g. the above-mentioned monovalent alkyl or aryl residues. The bridge group is preferably an alkylene, particularly a propylene, group.

Concrete examples are vinylsilanes, acrylsilanes and methacrylsilanes, such as vinyltriethoxysilane, (meth)acryloyloxyalkyltrimethoxysilane and (meth)-acryloyloxyalkyltriethoxysilane, e.g. methacryloyloxypropyltrimethoxysilane (MPTS).

In one embodiment, at least one silicon compound can be used with at least one non-hydrolyzable group of formula (III) in combination with at least one hydrolyzable silicon compound of formula (I) as the Si component of the heterocondensate. As silanes of formula (III), those with a non-hydrolyzable residue without a polymerizable group or those with a non-hydrolyzable residue with a polymerizable group or mixtures thereof can be used. Only one or more hydrolyzable silicon compounds with at least one non-hydrolyzable group can also be used as the silicon component, e.g. one or more of the silanes of formula (III).

Instead of or in addition to the hydrolyzable silicon compounds referred to above of formula (I), a silicon compound with a polymerizable group is preferably used, as discussed above, as the at least one hydrolyzable silicon compound of formula (III) to produce the heterocondensate. The heterocondensate can, however, also be produced without such a hydrolyzable silicon compound with a polymerizable group.

The hydrolyzable silicon compounds are referred to also as silanes. Silanes and polysiloxanes described below may be produced by known methods; see W. Noll, "Chemistry and Technology of the Silicons", Chemie GmbH Press, Weinheim/Bergstrasse (1968).

The molar ratio of Si atoms of all the Si compounds used to the metal, phosphorus and boron atoms of all the metal, phosphorus and boron compounds referred to above which are used in the heterocondensate can be selected in broad ranges but is preferably 10:1 to 1:3 and more preferably 5:1 to 1:1.

In addition to the aforementioned metal, phosphorus or boron compounds, additional metal compounds can be used. Examples of such metal compounds are compounds of other glass- or ceramic-forming metals, particularly compounds of at least one metal from the main group III and V and/or the sub-groups II to VIII of the periodic table of the elements. They are e.g. hydrolyzable compounds of Mn, Cr, Fe, Ni, Ga, In, Sc, Y and Zn. Also usable are e.g. hydrolyzable compounds of elements of the main groups I and II of the periodic table, e.g. Na, K and Ca. Hydrolyzable compounds of the lanthanoids, such as Ce, can also be used. They are e.g. metal compounds of the general formula $M'X_a$, wherein M' is a metal of the main groups I, II, III or V or of the subgroups II to VIII of the periodic table of the elements or a lanthanoid, X and a are as defined in formula (II).

In order to produce the heterocondensate, the at least one silicon compound and the at least one metal, phosphorus or boron compound are subjected to hydrolysis by mixing with water, wherein the reaction is preferably performed in accordance with the CCC method discussed below in order to produce a homogeneous heterocondensate of Si components and metal, phosphorus or boron components. The hydrolysis occurs, in particular, in accordance with the sol-gel process. In the sol-gel process, the hydrolyzable compounds are generally hydrolysed with water, optionally in the presence of acidic or basic catalysts. The hydrolysis preferably occurs in the presence of acidic catalysts, e.g. hydrochloric acid or phosphoric acid, preferably at a pH value of 1 to 3. The sol which forms can be adjusted by suitable parameters, e.g. degree of condensation, solvent or pH value, to the viscosity desired for the bonding agent. Sol-gel processes have been known for a long time. Details of the sol-gel process are described in e.g. C. J. Brinker, G. W. Scherer: "Sol-Gel Science—The Physics and Chemistry of Sol-Gel Processing", Academic Press, Boston, San Diego, New York, Sydney (1990).

Stoichiometric volumes of water but also smaller or larger amounts can be used for the hydrolysis, e.g. up to 1.2 mols water per mol of the hydrolyzable groups which are present. A sub-stoichiometric amount of water, with respect to the hydrolyzable groups which are present, is preferably used. The amount of water used for the hydrolysis and condensation of the hydrolyzable compounds is preferably 0.1 to 0.9 mol, and particularly preferably 0.25 to 0.75 mol, water per mol of the hydrolyzable groups which are present. Particularly good results are frequently achieved with less than 0.7 mols of water, particularly 0.45 to 0.65 mols of water, per mol of the hydrolyzable groups which are present. All hydrolyzable groups of the starting compounds which are added overall are to be understood here as the hydrolyzable groups which are present, that is to say including the metal, phosphorus or boron compounds which are optionally only added later.

Hydrolyzable silicon compounds and metal, phosphorus or boron compounds have different reactivities as regards hydrolysis and condensation. The hydrolysis products are also quite unstable so that after hydrolysis has occurred condensation reactions follow. If e.g. hydrolyzable silicon compounds and titanium compounds are hydrolysed simultaneously, separate $TiO_2$ particles are formed so that a large proportion of the Ti is not incorporated in molecular form into the network of the condensate which forms.

In a preferred embodiment, the hydrolysis therefore occurs in two or more stages in accordance with the so-called chemically controlled condensation process (CCC process, chemically controlled condensation process). Account is taken of the fact that the hydrolyzable compounds which are used have different hydrolysis reactivities. As stated above, the metal, phosphorus or boron compounds, in particular, generally have a higher hydrolysis reactivity than hydrolyzable silanes.

In the preferably two- or multi-stage hydrolysis process, one or more hydrolyzable compounds with a low hydrolysis reactivity are firstly mixed in general with the volume of water, which is provided for the formation of the hydrolysate or condensate, in order to prehydrolyse these compounds and then one or more hydrolyzable compounds with a higher hydrolysis reactivity are added to these mixtures. This can, if required, be further differentiated by performing three or more stages.

In the production of the heterocondensate in two or more stages, there is firstly a hydrolysis of the silanes by mixing hydrolyzable silanes and water, optionally in the presence of a catalyst. As a result of the hydrolysis, the free water which is added is absorbed. The hydrolyzed silanes can then undergo condensation reactions, in which water is liberated again. Even if condensation reactions can optionally begin before the silanes have been completely hydrolysed, the content of free water in the mixture sinks with time after the addition of the water to a minimum and then rises again due to the condensation reactions. Since, preferably, at most a stoichiometric amount and more preferably a sub-stoichiometric amount of water is added, with respect to the hydrolyzable groups of the hydrolyzable silanes, the water which is used is initially completely or substantially completely absorbed before water is liberated again by the condensation, i.e. at the least practically no water or only a little water is present in the mixture.

The metal, phosphorus or boron compound is preferably added to the mixture of the hydrolyzable silicon compound and water when the water in the reaction mixture has been substantially consumed by the hydrolysis, i.e. at the time of the addition of the metal, phosphorus or boron compound no water or only a small amount of water is present in the reaction mixture, preferably less than 15%, preferably less than 10% and particularly preferably less than 5% of the water volume, which was added for the hydrolysis. The metal, phosphorus or boron compound is also added, in particular, before a higher content of free water forms in the reaction mixture as a result of the condensation reactions.

The methods of determining the water content in a mixture are known to be expert. Examples of suitable methods are Karl-Fisher Titration or IR Spectroscopy. The suitable period of time for adding the metal or boron compound can also be determined empirically, e.g. in the context of preliminary experiments, in which the metal, phosphorus or boron compound is added at predetermined times to the mixture of hydrolyzable silicon compound/water and a check is then made, e.g. by photon correlation spectroscopy (PCS) or Dynamic Light Scattering, whether particles are forming, which are the oxides of the metal or boron compound, for instance $TiO_2$ particles. If such particles form, the addition was effected too early or too late. The suitable time period for the addition, in which these particles are not formed, can easily be determined in this manner.

Another, easily performable method for determining the time of the addition is the determination of the clear point. Before the initiation of the electrolysis, the silane phase is not miscible with water. When water is added, this is indicated by cloudiness of the stirred reaction mixture. It is only as a result of the formation of alcohol and $=SiOH$ with the simultaneous consumption of water that the system becomes of single phase type and indicates the continuing consumption of $H_2O$. These two phases merge into one another at the clear point and the reaction mixture clarifies. Since the clear point generally occurs roughly when the added water has been substantially consumed or the water content is at a minimum, the metal, phosphorus or boron compound can be added when the clear point has been reached. This naturally includes addition shortly before or after the clear point.

The heterocondensate which is obtained can be used as it is. It can be adjusted to the viscosity desired for the bonding agent by suitable parameters, e.g. degree of condensation, solvent or pH value. In a preferred embodiment, the bonding agent was permitted to mature or age by simply letting it stand, e.g. for at least 1 h and preferably at least 5 h. Thereafter, it can be used for the intended application for the bonding agent.

It has also been determined surprisingly that an even more homogeneous heterocondensate can be obtained if the starting materials are used in undiluted form, i.e. without a solvent. The hydrolysis and condensation are therefore preferably performed without the addition of solvent. Account should be taken of the fact that in the hydrolysis reactions of the starting materials, as with alcoholates, solvents can form in situ. The reaction mixture is thus generally not free of solvent as the hydrolysis progresses but is substantially less diluted than is otherwise conventional in the prior art. After completion of the reaction, e.g. after the above maturation, solvent can be added, e.g. to adjust the viscosity.

The heterocondensate accordingly includes a metallo-, phosphoro- or borosiloxane, which includes heteratom units from heteroatoms selected from P, B, Al, Ge, Sn, Pb, Ti, Mg, Li, V, Nb, Ta, Zr and Hf, which are incorporated into the siloxane structure by way of oxygen bridges, and siloxane units, in which the silicon atom optionally has a non-hydrolyzable organic group. The heteroatom is incorporated into the siloxane structure by way of 2, 3 or 4 oxygen bridges, depending on the valency. B, Al, Sn, Ti or Zr are preferably used as the heteroatoms so that boro-, alumino-, stanno-, titan- or zirconosiloxane are formed, whereby titanosiloxanes are particularly preferred. At least a proportion of the Si atoms or all the Si atoms of the siloxane structure preferably have a non-hydrolyzable organic group, which preferably includes a polymerizable group or an alkyl or aryl group.

The bonding agent further includes a purely organic component B), so that an additional, organic matrix can be constructed. The organic component of the monomers or oligomers defined below is preferably soluble. As a result of the use of the organic component, a further improved mechanical strength and flexibility is achieved. After the hardening process, two penetrating polymers, namely the heterocondensate and a purely organic polymer, are produced so that IPN polymers (IPN=Interpenetrating Networks, see e.g. Römpp Chemical Dictionary, 9th Edition, p. 2007) are formed. The penetrating polymers can be mixed purely physically.

One or more organic polymerizable monomers or oligomers, which have at least one C—C double bond are used for the organic bonding component B). The olefinic group is, in particular, a radically polymerizable group. Thermally polymerizable groups are preferred. A mixture of two or more monomers or oligomers can also be used. Examples of olefinically polymerizable groups are alkenyl, vinyl, allyl, acryloyl, acryloyloxy, methacryloyl, methacryloyloxy and styryl and acryl and methacryl groups are preferred.

The organic monomer or oligomer includes one and preferably at least two polymerizable groups. Organic monomers or oligomers with at least two C—C double bonds are thus preferred, particularly diacrylates and dimethacrylates. Organic monomers or oligomers are very well known to the expert as bonding agent components and he can readily select them in a suitable manner in accordance with requirements. The organic compound which is used can be defined individual compounds or mixtures of compounds with a differing degree of polymerization.

Mono-, bi- or polyfunctional acrylates and methacrylates are preferably used as the monomers or oligomers. Concrete examples of the organic monomer or oligomer are diethylene glycol dimethacrylate (DEGDMA), triethylene glycol dimethacrylate (TEGDMA), bisphenol A-glycidyl methacrylate (BisGMA), bisphenol A-diacrylate, acrylic acid butyl ester (AB), diurethane dimethacrylate, urethane dimethacrylate (UDMA), styrol, styrol derivatives, vinyl pyridine, vinyl benzene sulphonic acid, Laromer®-acrylates from BASF, Ebecryl®, pentaerythritol triacrylate (PETIA), hexanediol diacrylate, trimethylolpropane triacrylate, trimethylolpropane trimethacrylate, neopentyl glycol dimethacrylate, neopentyl glycol diacrylate, epoxy acrylate resins, oligomeric methacrylates, such as LR 8862, LR 8907 from BASF, or oligomeric urethane acrylates, such as UA 19T from BASF, and oligomers of the said monomers.

A thermal polymerization initiator without peroxide functionality, preferably an azo compound, is added to the bonding agent as a thermal initiator or starter for the polymerization, which is, in particular, a radical initiator. The initiator starts the polymerization, whereby the bonding agent is cured or cross-linked Without peroxide functionality or without a peroxide function means a thermal polymerization initiator without a peroxide group. Azo compounds have been known as radical formers for a long time and are frequently used in polymerization chemistry. They are commercially available. The expert can easily select suitable ones taking account of the components used.

Examples are azobisnitriles, such as azobisisobutyronitrile (AIBN), 2,2'-dimethyl-2,2'-azodipropiononitrile (Vazo® 64), 2,2'-azobis(2-methylbutyronitrile) (Vazo®67), 1,1'-azo-bis-(cyclohexane carbonic acid nitrile) (Vazo®88), 2,2'-azobis(2,4-dimethylvaleronitrile) (Vazo® 52) or azobiscarbonic acid esters, such as dimethyl-2,2'-azo-bisisobutyrate and azobiscarbonic acid amides. Many different azo starters are obtainable from DuPon in the Vazo® product range.

Further compound classes which can be used as thermal polymerization initiators without peroxide functionality, particularly as thermal radical starters, are compounds which can be subjected to a homolytic splitting of the C—C bond as a result of thermal activation. The C—C bond is a C—C single bond in this case. Examples are 2,3-dimethyl-2,3-diphenylbutane (Perkadox®30; Akzo Nobel) and alpha-hydroxyketones. It has transpired that radical starters, which are normally used for activation by UV light, also form radicals as a result of the supply of thermal energy. All radical formers activatable by UV light can thus be used so long as they have no peroxide function. Examples of this are the Irgacure® product family from the company BASF.

The thermal polymerization initiator, e.g. the azo compound or the compound, which has a C—C bond, which is homolytically splittable by thermal energy, can e.g. be stirred into the liquid bonding agent before the beginning of the infiltration. The initiator can be used in the usual amounts known to the expert, e.g. 0.01 to 5 wt. % with respect to the solid material content of the bonding agent.

In a preferred embodiment, particularly when a step of expelling a proportion of the infiltrated bonding agent with a liquid is performed, the bonding agent includes at least one hydrolyzable silicon compound as a further component, which includes a non-hydrolyzable organic residue with at least one hydrophilic group. This is, in particular, a monomeric, hydrolyzable silicon compound. It can be a silane of the general formula (IIIa)

$$R'_n SiX_{4-n} \quad \quad \quad \text{(IIIa)}$$

wherein the residues R' are the same or different and represent hydrolytically non-separable groups, wherein at least one residue R' has at least one hydrophilic group as a substituent, the residues X are the same or different and represent hydrolytically splittable groups or hydroxy groups and n has the value 1, 2 or 3, preferably 1.

As examples for X, reference is made to the examples referred to above for X in formula (I), whereby the preferred groups are preferred here also. The at least one hydrolytically non-separable residue R' with at least one hydrophilic group includes a divalent bridge group by means of which the hydrophilic group is connected to the silicon atom. In addition to the residue R' with a hydrophilic group, the silane of the formula (IIIa) can have one or two further non-hydrolyzable residues R' without a hydrophilic group. Examples of the group R' without hydrophilic groups correspond to the examples for the group R in the above general formula (III). The silane of formula (IIIa) preferably includes only one group R' (n=1), wherein this group R' has a hydrophilic group.

Examples for the hydrophilic group of the hydrolyzable silane are a glycidyloxy, amino, polyethylene glycol, polyethylene amine, carbaldehyde, epoxy, hydroxyl, carboxy, mercapto, acid anhydride, sulphonato and phosphonato group, wherein the glycidyloxy group and amino group are particularly preferred. With silanes with an epoxy group, such as glycidyloxypropyl trialkoxysilane, the epoxy groups can open under use conditions into diol groups. Polyethylene glycol and polyethylene amine groups constituting hydrophilic groups can be obtained e.g. by conversion of glycidyloxypropyl trialkoxysilane with polyethylene glycol (PEG) or polyethylene amine. Such compounds are also commercially available.

The hydrophilic group is bonded to the silicon atom by way of divalent bridge groups, in particular alkylene or arylene bridge groups, which can be interrupted by oxygen or NH groups. The bridge groups include e.g. 1 to 8, preferably 1 to 6, carbon atoms. The aforementioned divalent bridge groups are derived e.g. from the aforementioned univalent alkyl or aryl residues for the substitutent R in the general formula (III). The bridge group is preferably an alkylene, particularly a propylene, group. Preferred substituents with a hydrophilic group are glycidyloxy-($C_{1-8}$) alkylenes, such as glycidyloxypropyl, 2-(3,4-epoxycyclohexyl) ethyl, amino-($C_{1-8}$)-alkylene and hydroxyl-($C_{1-8}$)-alkylene. Glycidyloxypropyl and aminopropyl are particularly preferred residues.

Examples of a particularly preferred hydrolyzable silicon compound which is used, which includes a non-hydrolyzable organic residue with at least one hydrophilic group, are glycidyloxypropyl trialkoxysilanes and aminopropyl trialkoxysilanes, including mono-, di- and triaminopropyl trialkoxysilanes. Concrete examples of the hydrolyzable silicon compound are glycidyloxypropyl trimethoxysilane (GPTS), γ-glycidyloxypropyl triethoxysilane (GPTES), 3-aminopropyl trimethoxysilane (APTS), 3-aminopropyl triethoxysilane (APTES), hydroxymethyl trialkoxysilane, such as 3-hydroxypropyl trimethoxysilane, 3-hydroxypropyl triethoxysilane, N-hydroxyethylaminopropyl trialkoxysilane, 2-methoxy(polyethyleneoxy)propyl trialkoxysilane [CAS No. 65994-07-2], N-trimethoxysilylpropyl-NNN-trimethylammonium chloride [CAS No. 35141-36-7], [3-(triethoxysilyl)propyl]succinic acid anhydride, (dihydro-3-(3-triethoxysilyl)propyl)-2,5-furandione and [3-(trimethoxysily)propyl]succinic acid anhydride or reaction products of glycidyloxypropyl trialkoxysilane and polyethylene glycol (PEG) or reaction products of glycidyloxypropyl trialkoxysilane and polyethylene amine. The alkoxy group of all the compounds referred to above can be any conventional one and the most common are methoxy or ethoxy groups. The compounds are commercially available and/or can be produced by methods known to the expert.

As a result of the addition of hydrophilic silanes which have at least one non-hydrolyzable group with at least one hydrophilic group to the heterocondensate and the polymerizable monomer or oligomer, an additional phase or emulsified phase is produced, which is sticky, has a significantly improved viscosity and has an extremely high adhesion to the rock surfaces. Without wishing to be tied to a theory, it is presumed that this phase can cause a substantially higher amount of polymerizable bonding agent being able to remain in the formation, even if flushing is performed with a salt-containing, aqueous liquid so that after curing an improved strength of e.g. between 5 and 10 MPa is thus obtained.

The order in which the individual components are added may be chosen at will. In a preferred embodiment, e.g. the heterocondensate is mixed with the at least one monomer or oligomer. If used, the at least one hydrolyzable silicon compound, which includes a non-hydrolyzable group with at least one hydrophilic group, is then added. Further additives, such as described below, can then be added. They can also readily be added beforehand. The azo compound is generally stirred in to the liquid bonding agent solution at the end shortly before the infiltration process.

The bonding agent can include polysiloxanes as an additional component, such as poly(alkoxysilanes) or polyalkylsiloxanes or corresponding polyarylsiloxanes and copolymers thereof. Polysiloxanes can be used which carry no reactive groups. Preferably, however, polysiloxanes are used, which have at least one reactive group, particularly a reactive end group. IPN polymers with covalent bonds between the penetrating polymers can thus be obtained. IPN polymers can, however, also be formed which are purely physically mixed.

There are a great many poly(alkoxysilanes), polyalkylsiloxanes and polyarylsilanes and copolymers thereof with reactive end groups. In particular, such polysiloxanes, particularly polyalkylsiloxanes with reactive groups or end groups are commercially available, e.g. from Gelest, Inc., Philadelphia. Examples of the reactive group or end group are vinyl, hydride, silanol, alkoxy, amines, epoxy, carbinol, methacrylate/acrylate, mercapto, acetoxy, chloride and dimethylamine. The polysiloxanes can be bonded or cross-linked via the reactive groups or end groups into the inorganic network and optionally into the organic matrix. If e.g. polysiloxanes with silanol end groups are used, the silanol group will react with hydroxyl groups of the hydrolysed silanes or the metal or boron compounds. The elasticity or compression strength is thereby surprisingly yet further increased.

The polysiloxanes can be branched or preferably linear. The reactive group can be present on the main chain or a side chain but is preferably an end group. More than one reactive group can of course be present, e.g. 2 or more reactive groups. A linear polysiloxane includes e.g. preferably two reactive end groups. Polysiloxanes with silanol and alkoxy groups are preferably used as the polysiloxanes with reactive groups or end groups, particularly polysiloxanes with silanol end groups.

Examples of poly(alkoxysilanes), polyalkyl- or polyarylsiloxanes and copolymers thereof are polydimethylsiloxanes, polydiethylsiloxanes, polymethylethylsiloxanes, polydiphenylsiloxanes and corresponding copolymers, which each include at least one reactive group. Special examples are polydimethylsiloxanes with silanol end groups or with alkoxy end groups, poly(di-ethoxysiloxanes) and polydimethoxysiloxanes.

The molecular weight of the polysiloxanes used can be selected from a large range depending on the application range, for instance in the range of 100 to 10,000 g/ml. Preferably, polysiloxanes with a molecular weight from 100 to 3500 g/mol and preferably 300 to 3000 g/mol, e.g. 400 to 2000 g/mol are preferred. Higher molecular polysiloxanes can also be used, e.g. with a molecular weight of up to 50000 g/mol or more. The term molecular weight is to be understood herein as the mean value of the molecular weight.

Non-reactive oligomers or polymers can be added as additional organic components. These non-reactive oligomers and polymers have no polymerizable or polycondensable groups and are consequently not subject to polymerization and thus also to polymerization shrinkage.

The weight ratio of all the inorganic components which are used, including the organic groups contained therein, to the purely organic components which are used can be selected in wide ranges and is, with respect to the cured bonding agent, e.g. 95:5 to 5:95, and preferably 80:20 to 20:80. If a hydrolyzable silicon compound, which includes a non-hydrolyzable residue with at least one hydrophilic group, is used, the weight ratio of heterocondensate/organic polymerizable monomer or oligomer/hydrolyzable saline with a hydrophilic group is suitably 5-94.5%15-94.5%/0.5-10%, preferably 29-70%/29-70%/1-5% and particularly preferably 39-60%139-60%/1-2%.

The bonding agent can include a buffer as a further component. As a result of the buffer the pH value of the bonding agent can be adjusted to a desired value and on the other hand the bonding agent is stabilised, i.e. if the bonding agent is diluted or if acid or bases are added to the bonding agent in amounts which are not too large, the pH value of the bonding agent scarcely changes. As a result of the addition of the buffer, the pH value of the bonding agent can be adjusted to a value in the range of 2 to 7, preferably 4 to 6, preferably 4.5 to 6 or 4 to 5.

Buffers on the basis of a weak acid and the conjugate base are preferred. They can be polymeric buffers or mixtures of different acids and/or bases. Such buffers and their useful buffer range are known to the expert. All conventional buffer systems suitable for this pH range can be used for the bonding agent in accordance with the invention and the expert can readily select them.

The buffer can be formed with an organic solvent, preferably alcohol, such as methanol or ethanol. With buffers on the basis of organic acids, the salt of the organic acid can be e.g. 1 to 20 wt. % of the buffer. Buffers are commercially available or can be readily manufactured by the expert.

Examples of suitable buffers are (the effective buffer range is given in brackets): acetic acid/acetate buffer (pH=3.7-5.7), citric acid/trisodium citrate buffer (pH=2.2-8), tartaric acid/tartrate buffer, 2-(4-(2-hydroxyethyl)-1-piperazinyl)ethanesulphonic acid (pH=6.8-8.2) and 2-(N-morpholino)ethanesulphonic (pH=5-7). Buffers with organic acids are particularly preferred. An acetic acid/acetate buffer, with which the pH value can be set to about 4.75, is particularly preferred. Buffers based on carbonic acid are preferred, since, in addition to the buffer action, they can also extend the open time or gelation time.

The bonding agent can further include a complexing agent. This is particularly preferred if the bonding agent includes a buffer system. As a result of the complexing agent, "peaks" e.g. of oxide components, which contain metal components such as Al, Ti or Zr, can be "deactivated". The complexing agent can be e.g. an organic acid or a chelating agent. The complexing agent is preferably suitable for complexing higher valency ions or metal ions, such as Al-, Ti or Zr-ions. These are known to the expert.

Examples of complexing agents or chelating agents are α- and β-hydroxycarbonyl compounds, such as hydroxycarbonic acids, ketones or aldehydes and their analogs, such as β-diketones, such as acetylacetone and ethylacetoacetate, polyoxycarbonic acids, polyamines, such as ethylenediamine, amino alcohols, such triethanolamine, dialkyldithiophosphate, dodecylbenzenesulphonic acid, EDTA and nitrilotriacetic acid, wherein β-diketones are particularly preferred. Examples of organic acids are acetic acid, citric acid, tartaric acid, oleic acid and palmitic acid. The complexing agent is preferably so selected that, at the set pH value, it has a complex-forming action on the metal cations, such as $Al^{3+}$, $Zr^{4+}$ or $Ti^{4+}$ or the oxides derived from them contained in the bonding agent.

Solvents, particularly polar solvents, can be added to the bonding agent. Examples are alcohols, preferably lower aliphatic alcohols ($C_1$-$C_8$-alcohols), such as methanol, ethanol, 1-propanol, isopropanol and 1-butanol, ketones, preferably lower dialkylketones, such as acetone and methylisobutylketone, ethers, preferably lower dialkylethers, such as diethylether, or monoethers of diols, such as ethylene glycol or propylene glycol, with $C_1$-$C_4$-alcohols, amides, such as dimethylformamide, tetrahydrofuran, dioxane, sulphoxide, sulphone or butyl glycol and mixtures thereof. Alcohols are preferably used. High boiling point solvents can also be used; e.g. polyethers, such as triethylene glycol, diethylene glycol diethyl ether and tetraethylene glycol dimethyl ether.

Other conventional additives, which can optionally be added to the bonding agent, are e.g. dyes, pigments, viscosity regulators and tensides. For the production of emulsions of the bonding agent, e.g. the stabilising emulsifiers conventional with silicon emulsions, such as Tween® 80 and Brij® 30 can be used.

The bonding agent in accordance with the invention which is obtained is particularly liquid and is preferably present in particle-free form as a solution or emulsion, it is preferably free of crystalline products or particles and this can be determined e.g. by photon correlation spectroscopy (PCS).

The bonding agent and method of the invention are preferably used when crude oil or natural gas is contained in the geological formation or a geological formation situated beneath it. The bonding agent in accordance with the invention is used for the stabilisation of the gelation time of the bonding agent in the consolidation of geological formations. All the comments above relating to the features of the bonding agent and method of the invention apply correspondingly to the use.

DETAILED DESCRIPTION OF THE INVENTION

Examples follow to explain the invention, which examples are in no way intended to limit it.

EXAMPLE 1

33.1 g MPTES were caused to react with 2.6 g 10 wt. % HCl. 13 g TET were added after the clear point. After the complete incorporation of the titanium alcoholate into the Si matrix, 3.1 g water were added. 51 g butanediol dimethacrylate and 4 g APTES were then added to the hydrolyzate whilst stirring in order to produce a bonding agent A.

300 mg Vazo 67 were added to 30 g of the bonding agent A produced as above and stirred at room temperature until the solid material in the bonding agent had completely dissolved.

COMPARATIVE EXAMPLE 1

30 g of the bonding agent A produced as described above in Example 1 had 600 mg Trigonox 121 added to it instead of the azo compound and were briefly stirred at room temperature.

Results of the Gelation Times

Different catalytically active substances were added to the bonding agents of Example 1, to which azo initiator or peroxide initiator was added, and of comparative Example 1 and the gelation times at 50° C. were examined by comparison with a reference without the addition of a catalytically active substance. Sands 1 and 2 are samples from different geological formations.

|  | Reference | +$Fe^{2+}$ (50 ppm) | +$Fe^{3+}$ (100 ppm) | +$Cu^{2+}$ (50 ppm) | Coiled tubing | Sand 1 (20 wt. %) | Sand 2 (20 wt. %) |
| --- | --- | --- | --- | --- | --- | --- | --- |
| Ex. 1 Azo initiator | 120 min | 115 min | 125 min | 330 min | 150 min | 140 min | 130 min |
| Comparative Ex. 1 Peroxide Initiator | 125 min | 95 min | 90 min | 30 min | 60 min | 75 min | 105 min |

What is claimed is:

1. A method of stabilizing the gelation time of a bonding agent in the consolidation of geological formations in the presence of one or more catalytically active substances, wherein the one or more catalytically active substances comprise one or both of iron ions and copper ions, and the consolidation comprises infiltrating the bonding agent into a formation, optionally expelling a portion of the infiltrated bonding agent by flushing with a gas or a liquid, and curing the bonding agent remaining in the formation, and wherein the method comprises using as bonding agent an agent which comprises a mixture of (A) a heterocondensate, obtainable by hydrolysis and condensation of at least one hydrolyzable silicon compound and at least one metal, phosphorus or boron compound, the metal being selected from one or more of Al, Ge, Sn, Pb, Ti, Mg, Li, V, Nb, Ta, Zr, Hf,
(B) at least one organic polymerizable monomer or oligomer comprising at least one C-C double bond, and
(C) one or more thermal polymerization initiators selected from initiators without peroxide functionality.

2. The method of claim 1, wherein the bonding agent is introduced into the formation through a steel pipe that is introduced into the geological formation.

3. The method of claim 1, wherein (C) comprises an azo compound.

4. The method of claim 3, wherein the azo compound is selected from one or more of azobisnitriles, azobiscarboxylic acid esters, azobiscarboxylic acid amides.

5. The method of claim 1, wherein (C) comprises a compound which has a C-C double bond that can be cleaved homolytically by thermal energy.

6. The method of claim 1, wherein the bonding agent further comprises one or more of a buffer, a complexing agent, a polysiloxane with at least one reactive group, and a solvent.

7. The method of claim 6, wherein the solvent is selected from alcohols, ethers, monoethers of diols.

8. The method of claim 1, wherein at least one hydrolyzable silicon compound for the heterocondensate comprises at least one non-hydrolyzable organic group which has a polymerizable group, or comprises at least one alkyl or aryl group as the non-hydrolyzable organic group.

9. The method of claim 1, wherein the heterocondensate is a metallo-, phosphoro- or borosiloxane and includes heteroatom units of at least one heteroatom selected from P, B, Al, Ge, Sn, Pb, Ti, Mg, Li, V, Nb, Ta, Zr and Hf, which are incorporated into the siloxane structure via oxygen bridges, and siloxane units in which all or a portion of the silicon atoms of the siloxane units comprise an optionally non-hydrolyzable organic group.

10. The method of claim 9, wherein the optionally non-hydrolyzable organic group is a polymerizable group or an alkyl or aryl group.

11. The method of claim 1, wherein the bonding agent is free of particles.

12. The method of claim 1, wherein at least one hydrolyzable silicon compound which comprises a non-hydrolyzable residue with at least one hydrophilic group is added to the mixture of the bonding agent.

13. The method of claim 12, wherein the at least one hydrophilic group of the non-hydrolyzable residue is a group selected from glycidyloxy, amino, polyethylene glycol, polyethylene amine, carbaldehyde, epoxy, hydroxyl, carboxy, mercapto, acid anhydride, sulfonato, and phosphonato groups.

14. The method of claim 12, wherein the non-hydrolyzable residue with at least one hydrophilic group is an alkyl group which comprises at least one hydrophilic group.

15. The method of claim 1, wherein a portion of the infiltrated bonding agent is expelled by flushing with an aqueous, salt-containing liquid.

16. The method of claim 1, wherein crude oil or natural gas is contained in the geological formation or a geological formation situated beneath it.

17. The method of claim 1, wherein the one or more catalytically active substances comprise $Fe^{2+}$ ions.

18. The method of claim 1, wherein the one or more catalytically active substances comprise $Fe^{3+}$ ions.

19. The method of claim 1, wherein the one or more catalytically active substances comprise copper ions.

20. The method of claim 1, wherein the one or more catalytically active substances comprise iron ions and copper ions.

* * * * *